(12) United States Patent
Beckman et al.

(10) Patent No.: US 9,645,790 B2
(45) Date of Patent: May 9, 2017

(54) ADDER DECODER

(71) Applicant: Cavium, Inc., San Jose, CA (US)

(72) Inventors: Edward Beckman, San Jose, CA (US); Nitin Mohan, Northborough, MA (US)

(73) Assignee: Cavium, Inc., San Jose, CA (US)

( * ) Notice: Subject to any disclaimer, the term of this patent is extended or adjusted under 35 U.S.C. 154(b) by 231 days.

(21) Appl. No.: 14/538,484

(22) Filed: Nov. 11, 2014

(65) Prior Publication Data

US 2016/0132294 A1    May 12, 2016

(51) Int. Cl.
    *G06F 7/50* (2006.01)
    *G06F 7/507* (2006.01)

(52) U.S. Cl.
    CPC ............ *G06F 7/507* (2013.01); *G06F 7/50* (2013.01)

(58) Field of Classification Search
    CPC .................................. G06F 7/50; G06F 7/507
    See application file for complete search history.

(56) References Cited

U.S. PATENT DOCUMENTS

| | | | | |
|---|---|---|---|---|
| 5,657,016 A | * | 8/1997 | Bakhmutsky | ......... H03M 7/425 341/65 |
| 2006/0026223 A1 | * | 2/2006 | Dhong | .................... G06F 5/012 708/209 |
| 2013/0339660 A1 | * | 12/2013 | Naethke | .............. G06F 12/0615 711/217 |

OTHER PUBLICATIONS

Stine, James E., et al., "Constant Addition Utilizing Flagged Prefix Structures," IEEE International Symposium on Circuits and Systems, 1:668-671 (May 23-26, 2005).

\* cited by examiner

*Primary Examiner* — Chuong D Ngo
(74) *Attorney, Agent, or Firm* — Hamilton, Brook, Smith & Reynolds, P.C.

(57) ABSTRACT

The present disclosure relates to an add and decode hardware logic circuit for adding two n bit inputs, A and B. A series of n logic stages are each configured to perform a first operation of propagating a result of a preceding stage on the condition that the sum of A[m] and B[m] is equal to 0, wherein 0<=m<n, perform a second operation of performing a bitwise left shift by $2^m$ of the result of the preceding stage on the condition that the sum of A[m] and B[m] is equal to 1, or perform a third operation of performing a bitwise left shift by $2^{m+1}$ of the result of the preceding stage on the condition that the sum of A[m] and B[m] is equal to 2. An output at the last stage provides a decoded sum of the inputs A and B.

14 Claims, 3 Drawing Sheets

FIG. 5

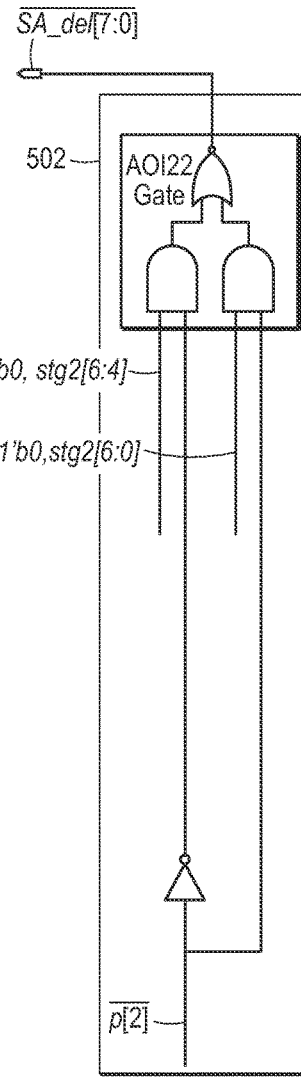
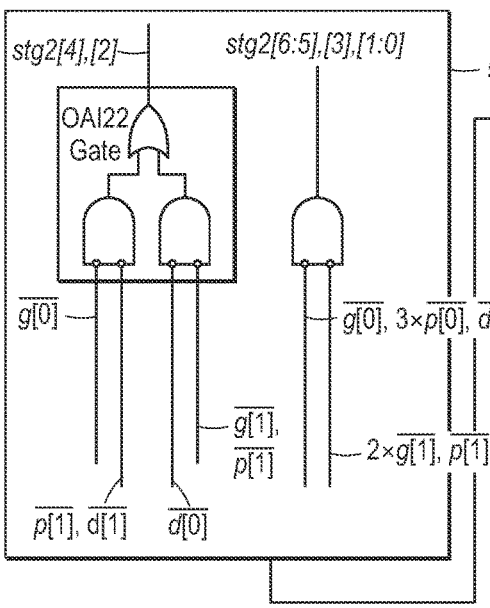
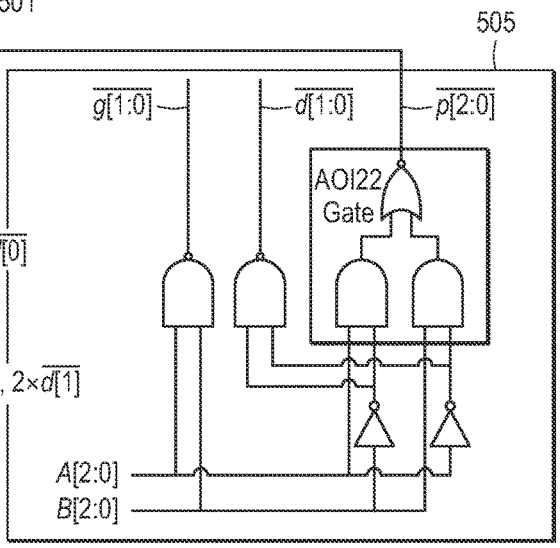

504

Generate (g[2:0]), Delete (d[2:0]), Propagate (p[2:0])
$\overline{g[2:0]} = \overline{A[2:0] \cdot B[2:0]}$
$\overline{d[2:0]} = \overline{\overline{A[2:0]} \cdot \overline{B[2:0]}}$
$\overline{p[2:0]} = \overline{A[2:0] \oplus B[2:0]}$ stg1 = 3'd1 << (A[0] + B[0])
$\overline{stg1[2]} = \overline{g[0]}$
$\overline{stg1[1]} = \overline{p[0]}$
$\overline{stg1[0]} = \overline{d[0]}$ stg2 = stg1 << (A[1] + B[1])
stg2[7] = 1'b0
$\overline{stg2[6]} = \overline{g[1]} + \overline{stg1[2]}$
$\overline{stg2[5]} = \overline{g[1]} + \overline{stg1[1]}$
$\overline{stg2[4]} = \overline{(g[1]+stg1[0]) \cdot (p[1]+stg1[2])}$
$\overline{stg2[3]} = \overline{p[1]} + \overline{stg1[1]}$
$\overline{stg2[2]} = \overline{(p[1]+stg1[0]) \cdot (d[1]+stg1[2])}$
$\overline{stg2[1]} = \overline{d[1]} + \overline{stg1[1]}$
$\overline{stg2[0]} = \overline{d[1]} + \overline{stg1[0]}$ stg3[7:0] = p[2] ? {stg2[3:0], stg2[7:4]} : stg2[7:0]
$\overline{stg3[7:0]} = \overline{p[2] \cdot stg2[3:0],[7:4] + \overline{p[2]} \cdot stg2[7:0]}$

ADDER DECODER

BACKGROUND

"Add-add_plus_constant-mux-decode" logic is an important element in modern processor design. It is often found in timing critical paths thereby limiting the maximum clock frequency that the processor can support. Therefore, improving the design of this logic can have impact on the overall clock frequency of the processor. Conventional approaches for designing this logic implement the adder, decoder and multiplexer as separate stages.

SUMMARY

An aspect of the present disclosure relates to an add and decode hardware logic circuit that includes n bit inputs, A and B, wherein n is greater than 1; n logic stages, each logic stage configured to: perform a first operation of propagating a result of a preceding stage on the condition that the sum of A[m] and B[m] is equal to 0, wherein $0<=m<n$; perform a second operation of performing a bitwise left shift by $2^m$ of the result of the preceding stage on the condition that the sum of A[m] and B[m] is equal to 1; perform a third operation of performing a bitwise left shift by $2^{m+1}$ of the result of the preceding stage on the condition that the sum of A[m] and B[m] is equal to 2; an output at stage n providing a decoded sum of inputs A and B.

An aspect of the present disclosure relates to an add and decode hardware logic circuit wherein the decoded sum of the output at stage n and a constant C is obtained by performing a bitwise left shift on the output at stage n by C.

Another aspect of the present disclosure relates to a method of adding and decoding in a hardware logic circuit, the method comprising: receiving n bit inputs, A and B, wherein n is greater than 1; for each logic stage of n logic stages in the hardware circuit: performing a first operation of propagating a result of a preceding stage on the condition that the sum of A[m] and B[m] is equal to 0, wherein $0<=m<n$; performing a second operation of performing a bitwise left shift by $2^m$ of the result of the preceding stage on the condition that the sum of A[m] and B[m] is equal to 1; performing a third operation of performing a bitwise left shift by $2^{m+1}$ of the result of the preceding stage on the condition that the sum of A[m] and B[m] is equal to 2; providing an output at stage n which is a decoded sum of inputs A and B.

Another aspect of the present disclosure relates to the method of adding and decoding in a hardware logic circuit in which the method further includes obtaining the decoded sum of the output at stage n and a constant C by performing a bitwise left shift on the output at stage n by C.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 5 is a schematic diagram illustrating one implementation of a three-bit operand example of the combined adder and decoder in accordance with embodiments of the disclosure.

DETAILED DESCRIPTION

A description of example embodiments of the invention follows.

The teachings of all patents, published applications and references cited herein are incorporated by reference in their entirety.

"Add-add_plus_constant-mux-decode" logic is an important element in modern processor design. It is often found in timing critical paths thereby limiting the maximum clock frequency that the processor can support. Therefore, improvements to the design of this logic can have significant impact on the overall clock frequency of the processor.

Figure 1:
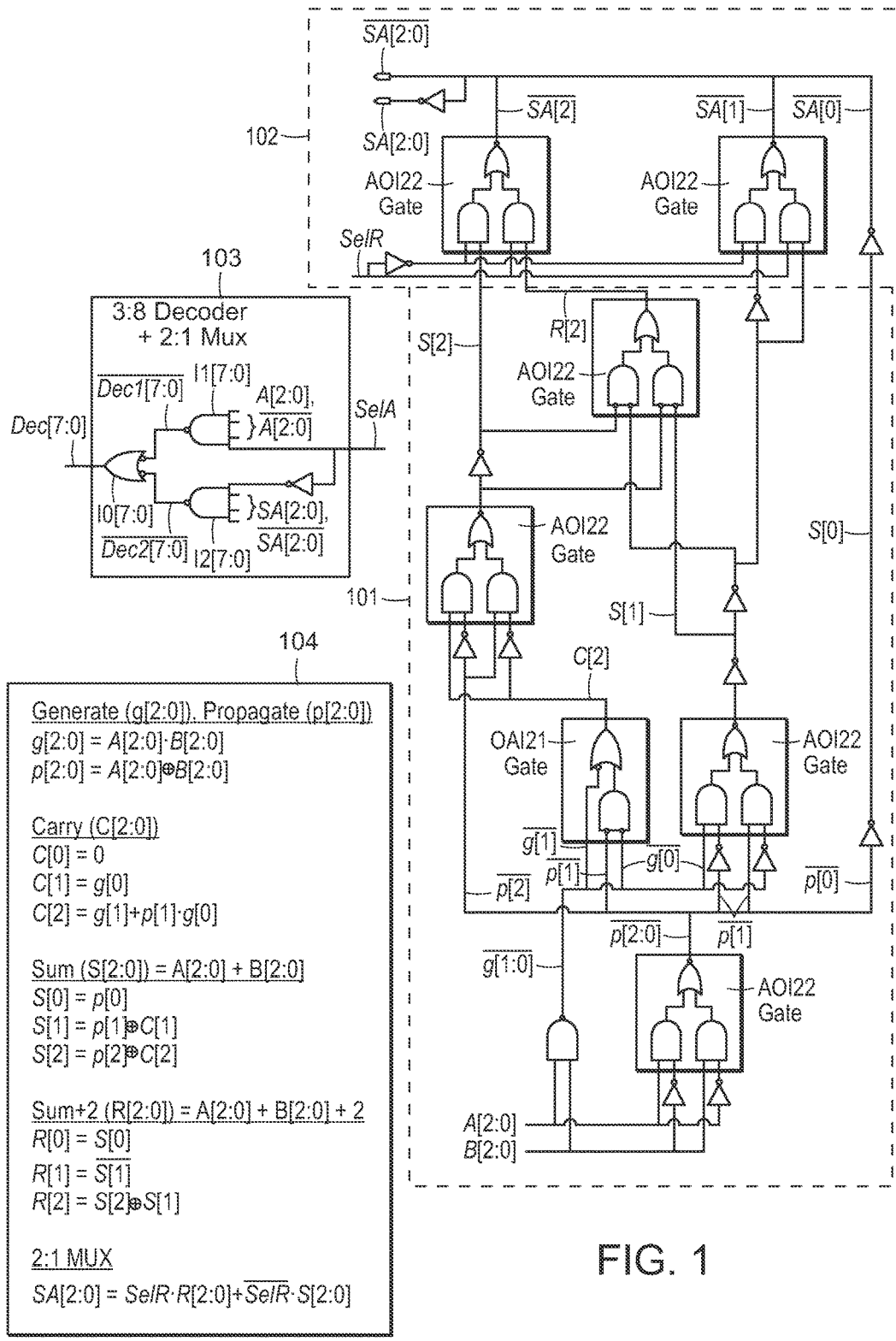
FIG. 1 is a schematic diagram illustrating a typical implementation of the sum of two 3-bit operands followed by the addition of a constant value of 2.

Conventional approaches for designing such logic implement separate stages of an adder, decoder and multiplexer. FIG. 1 is a schematic illustrating a typical implementation of the sum of two 3-bit operands followed by the addition of a constant value of 2 according to the logic equations 104 shown. First, the generate, propagate, carry, sum and sum plus 2 signals are computed 101. A multiplexer 102 selects the sum of the two 3-bit operands or their sum plus 2 and is followed by a 3-to-8 decoder 103.

A high-performance "add-add_plus_constant-mux-decode" logic circuit combining add and decode logic has been found to eliminate several logic gates on the timing critical path and increase the clock frequency of the chip. In one embodiment, a logic circuit combines add and decode logic, removing several logic gates on the timing critical path and increasing the clock frequency of the chip.

Figure 2:
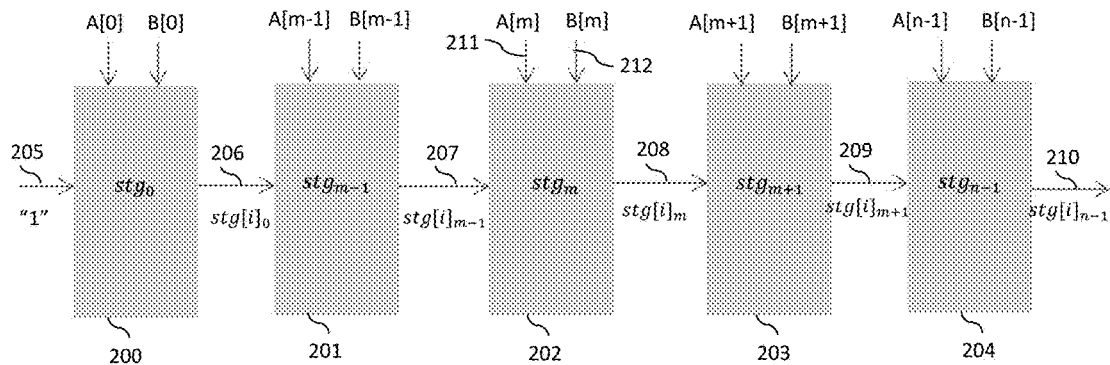
FIG. 2 is a block level diagram illustrating an example combined adder and decoder in accordance with embodiments of the disclosure.

FIG. 2 is block level diagram illustrating the combined adder and decoder in accordance with embodiments of the disclosure. A and B are n-bit operands. There are n stages 200-204, each stage, $stg_m$ 202, producing a partial decoded sum $stg_m[i]$ 208. The operation of each $stg_m$ 202 depends on the value of the sum of A[m] 211 and B[m] 212. If the sum of A[m] 211 and B[m] 212 is equal to zero, then the output of the previous stage, $stg_{m-1}[i]$ 207, is propagated to the output $stg_m[i]$ 208. If the sum of A[m] 211 and B[m] 212 is equal to one, the output of $stg_m[i]$ 208 is obtained by performing a bitwise left shift by $2^m$ on the previous stage output $stg_{m-1}[i]$ 207. If the sum of A[m] 211 and B[m] 212 is equal to two, output $stg_m[i]$ 208 is obtained by performing a bitwise left shift of the previous stage output $stg_{m-1}[i]$ 207 by $2^{m+1}$. It can be seen that a partial decoded sum of A[m:0] and B[m:0] is available at the output $stg_m[i]$ 208. Whether the sum of A[m] 211 and B[m] 212 is equal to zero, one or two at each stage, $stg_m$ 202, can be determined by the following:

$g[n-1:0]=A[n-1:0] \cdot B[n-1:0]$; indicates sum of two $d[n-1:0]=\overline{A[n-1:0]} \cdot \overline{B[n-1:0]}$; indicates sum of zero $p[n-1:0]=A[n-1:0]\ XOR\ B[n-1:0]$; indicates sum of one The output $stg_m[i]$ 208 for each stage, $stg_m$ 202, can be described according to the following, where $0 \leq m < n$:

$$stg_m[i]=g[m]\cdot stg_{m-1}[i-2^{m+1}]+p[m]\cdot stg_{m-1}[i-2^m]+d[m]\cdot stg_{m-1}[i]$$

$stg_m[j]=0$ for $j<0$

Figure 3:
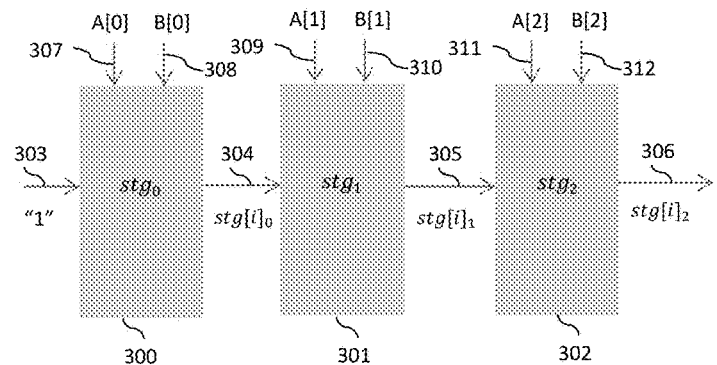
FIG. 3 is a block level diagram illustrating a three-bit operand example of the combined adder and decoder in accordance with embodiments of the disclosure.

FIG. 3 shows a block level diagram illustrating a combined adder/decoder of three-bit operands A and B, in accordance with embodiments of the disclosure. Stages $stg_0$ 300 and $stg_1$ 301 each produce a partial decoded sum at $stg_0[i]$ 304 and $stg_1[i]$ 305. The output $stg_2[i]$ 306 is the final decoded sum of A and B. The values of d[m], p[m] and g[m] respectively can indicate whether the sum of A[m] and B[m] is zero, one or two. At $stg_0$ 303, if the sum of A[0] 307 and B[0] 308 is equal to zero, as indicated by d[0], then the output of the previous stage, in this case "1" 303, is propagated to output $stg_0$ [i] 304. If the sum of A[0] 307 and B[0] 308 is equal to one, as indicated by p[0], the output $stg_0$ [i] 304 is obtained by performing a bitwise left shift by one bit position on "1" 303, resulting in "10" on the output $stg_0[i]$ 304. Finally, if the sum of A[0] 307 and B[0] 308 is equal to two, as indicated by g[m], the output $stg_0$ [i] 304 is obtained by performing a bitwise left shift on "1" 303 by two bit positions, resulting in "100" on the output $stg_0$ [i] 304. The next stage, $stg_1$ 301, receives the output $stg_0$ [i] 304. Because A[1] 309 and B[1] 310 are located at bit position $2^1$, a sum of A[1] 309 and B[1] 310 equal to one contributes a value of two to the decoded output. Therefore, if the sum of A[1] 309 and B[1] 310 is equal to one, the output $stg_1[i]$ 305 is obtained by shifting $stg_0[i]$ 304 to the left by two bits. Similarly, a sum of A[1] 309 and B[1] 310 equal to two, contributes a value of four to the decoded sum and the output $stg_1$ [i] 305 is obtained by shifting $stg_0$ [i] 304 to the left by four bit positions.

Figure 4:
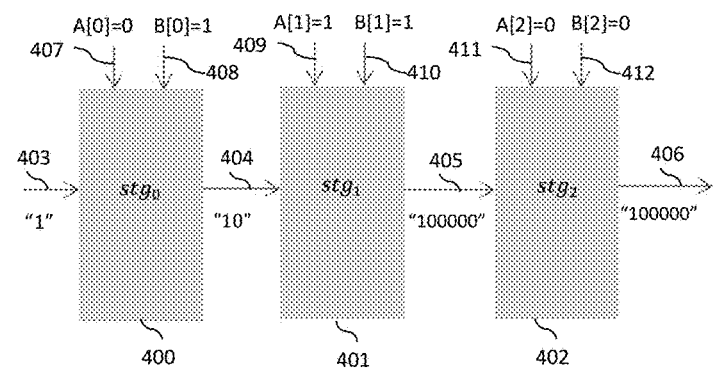
FIG. 4 is a block level diagram illustrating a three-bit operand example of the combined adder and decoder with operands A and B set to 2 and 3 respectively in accordance with embodiments of the disclosure.

FIG. 4 shows a block level diagram illustrating a combined adder/decoder of three bits where the value of operand A[2:0] is "010" and the value of operand B[2:0] is "011." The values of p[2:0], g[2:0] and d[2:0] are "001", "010" and "100" respectively. At $stg_0$ 400, the sum of A[0] 407 and B[0] 408 is equal to one. Therefore, output $stg_0[i]$ 404 of "10" is obtained by left shifting "1" 403 by one bit position. At $stg_1$ 401, the sum of A[1] and B[1] is one and a value on output $stg_1[i]$ 405 of "100000" is obtained by shifting $stg_0[i]$ 404 to the left by $2^2$ bit positions. Finally, at $stg_2$ 406, the sum of A[2] 411 and B[2] 412 is equal to zero. Therefore, output $stg_1[i]$ 405 is propagated to $stg_2$ [i] 406 resulting in a final decoded sum of "100000".

In general, the sum of A and B is n+1 bits wide where the MSB of the sum is the carry bit of the last stage. In the case where the carry bit of the final stage is left unused, the sum of A and B becomes n bits wide, the decoded sum of A and B has a value less than 2', and the shift operation at the final stage transforms into a rotate operation. The MSB of p can indicate the case of rotating the last stage output by $2^{n-1}$.

FIG. 5 is a schematic diagram illustrating one implementation of a three-bit operand example of the combined adder and decoder with operands A and B in accordance with embodiments of the disclosure. The corresponding logic equations 504 are shown. The g, p and d signals are generated at 505. The output of the first stage of the combined adder/decoder is "g[0], p[0], d[0]". The second stage 501 either propagates or performs a shift operation on the first stage's output value based on whether the sum of A[1] and B[1] is zero, one or two. The third stage 502 produces the decoded sum of A and B. This implementation provides, for three-bit operands, a savings of six gates over the typical implementation shown in FIG. 1.

TABLE 1

| Operands (bits) | Typical: adder logic (gates) | Typical: decoder logic (gates) | Typical: adder + decoder logic (total gates) | Combined adder/decoder logic (total gates) |
| --- | --- | --- | --- | --- |
| 2 | 3 | 2 | 5 | 2 |
| 3 | 4 | 2 | 6 | 3 |
| 4 | 4 | 3 | 7 | 4 |
| 5 | 5 | 3 | 8 | 5 |
| 6 | 5 | 3 | 8 | 6 |
| 7 | 5 | 3 | 8 | 7 |
| 8 | 5 | 3 | 8 | 8 |

Table 1 shows, for operands A and B of varying bit widths, the savings in number of gates between a typical implementation and an implementation using the combined adder/decoder. In a typical implementation, the number of gates for the adder logic assumes $\log_2 n+2$ stages for n-bit operands, where the $\log_2 n$ stages correspond to the carry propagation logic and are implemented using 2-input AOI/OAI gates. The extra two stages correspond to logic for an inversion and the sum. For a typical implementation, the number of gates for the decoder logic assumes $\log_3 n+1$ stages where the $\log_3 n$ stages correspond to the decode logic implemented with 3 high-stack gates and an additional stage for an inversion prior to the decode.

In one embodiment, a carry value generated by the last stage is left unused, which transforms the last stage shift operation into a rotate operation. In this case, the MSB of p can be used to indicate whether the last stage output needs to be rotated.

In one embodiment, the decoded sum of adding a constant C to the decoded sum of A and B can be obtained by left shifting the decoded sum by C bit positions.

While this invention has been particularly shown and described with references to example embodiments thereof, it will be understood by those skilled in the art that various changes in form and details may be made therein without departing from the scope of the invention encompassed by the appended claims.

What is claimed is:

1. A combined adder and decoder circuit, comprising:
   n bit inputs, A and B, wherein n is greater than 1;
   a hardware logic circuit with n logic stages, each logic stage having one or more gates, configured to:
     perform a first operation of propagating a result of a preceding stage on the condition that the sum of A[m] and B[m] is equal to 0, wherein $0 \leq m < n$;
     perform a second operation of performing a bitwise left shift by $2^m$ of the result of the preceding stage on the condition that the sum of A[m] and B[m] is equal to 1;
     perform a third operation of performing a bitwise left shift by $2^{(m+1)}$ of the result of the preceding stage on the condition that the sum of A[m] and B[m] is equal to 2;
   an output at stage n providing a decoded sum of inputs A and B.

2. The circuit of claim 1, wherein the output at stage n is $2^{(n+1)}$ bits wide.

3. The circuit of claim 1, wherein the output at stage m is $2^{(m+1)}$ bits wide.

4. The circuit of claim 1, wherein the operands A and B are each three-bits wide.

5. The circuit of claim 1, wherein the decoded sum of the output at stage n and a constant C is obtained by performing a bitwise left shift on the output at stage n by C.

6. The circuit of claim 5, wherein the constant C is 2.

7. The circuit of claim 5, wherein the constant C is 3.

8. A method for combined adding and decoding in a hardware logic circuit, the method comprising:
- receiving n bit inputs, A and B, wherein n is greater than 1;
- for each logic stage having one or more gates, of n logic stages in the hardware logic circuit:
  - performing a first operation of propagating a result of a preceding stage on the condition that the sum of A[m] and B[m] is equal to 0, wherein $0<=m<n$;
  - performing a second operation of performing a bitwise left shift by $2^m$ of the result of the preceding stage on the condition that the sum of A[m] and B[m] is equal to 1;
  - performing a third operation of performing a bitwise left shift by $2^{(m+1)}$ of the result of the preceding stage on the condition that the sum of A[m] and B[m] is equal to 2;
- providing an output at stage n which is a decoded sum of inputs A and B.

9. The method of claim 8, the method further providing a $2^{(n+1)}$ bits wide output at stage n.

10. The method of claim 8, the method further providing a $2^{(m+1)}$ bits wide output at stage m.

11. The method of claim 8, wherein the operands A and B are each three-bits wide.

12. The method of claim 8, further comprising:
- obtaining the decoded sum of the output at stage n and a constant C by performing a bitwise left shift on the output at stage n by C.

13. The method of claim 12, wherein the constant C is 2.

14. The method of claim 12, wherein the constant C is 3.

* * * * *